United States Patent [19]

Baker et al.

[11] 4,188,866
[45] Feb. 19, 1980

[54] PATTY BROILER

[75] Inventors: Edward D. Baker, San Francisco; Nils Lang-Ree, Los Altos; John S. Brown, Half Moon Bay, all of Calif.

[73] Assignee: NPI Corporation, Burlingame, Calif.

[21] Appl. No.: 807,001

[22] Filed: Jun. 16, 1977

[51] Int. Cl.² ............................................. A47J 37/06
[52] U.S. Cl. ...................................... 99/339; 99/386; 99/390; 99/443 C; 99/446
[58] Field of Search ................. 99/339, 327, 332, 335, 99/352–353, 355, 373, 386, 390–391, 392–393, 400–401, 423, 427, 443 C, 446–447, 450; 126/41

[56] References Cited

U.S. PATENT DOCUMENTS

| | | | |
|---|---|---|---|
| 2,917,990 | 12/1959 | Ehrenberg | 99/450 X |
| 3,152,535 | 10/1964 | Pollak, Jr. et al. | 99/423 X |
| 3,371,595 | 3/1968 | Peters | 99/352 |
| 3,456,578 | 7/1969 | Pinsly | 99/339 |
| 3,580,164 | 5/1971 | Baker | 99/391 X |
| 3,604,336 | 9/1971 | Straub et al. | 99/339 X |
| 3,610,134 | 10/1971 | Morley | 99/423 X |
| 3,693,536 | 9/1972 | Carville et al. | 99/400 X |
| 3,695,170 | 10/1972 | Ehrenberg | 99/443 C X |
| 3,721,178 | 3/1973 | Szabrak et al. | 99/443 C X |
| 4,023,007 | 5/1977 | Brown | 99/401 X |

Primary Examiner—George F. Mautz
Assistant Examiner—Arthur O. Henderson
Attorney, Agent, or Firm—Lothrop & West

[57] ABSTRACT

A patty broiler has a frame on which an openwork patty conveyor is arranged around pulleys to have an upper run and a lower run. Heaters are arranged on the frame above and below the upper run, and multiple reflectors are arranged on the frame above and below the conveyor. A doctor assists in dislodging patties from the far end of the upper run of the conveyor to fall onto a patty slide on the frame leading the patties by gravity toward the feed end of the frame. A bun conveyor is arranged on the frame beneath the patty conveyor. A bun heater transmits heat to buns on that conveyor and to the patty slide. The warmed bun halves are returned toward the feed end of the machine by a bun slide. An enclosing and vented jacket assists in retaining and diverting the heat and fumes and protects the machinery.

1 Claim, 7 Drawing Figures

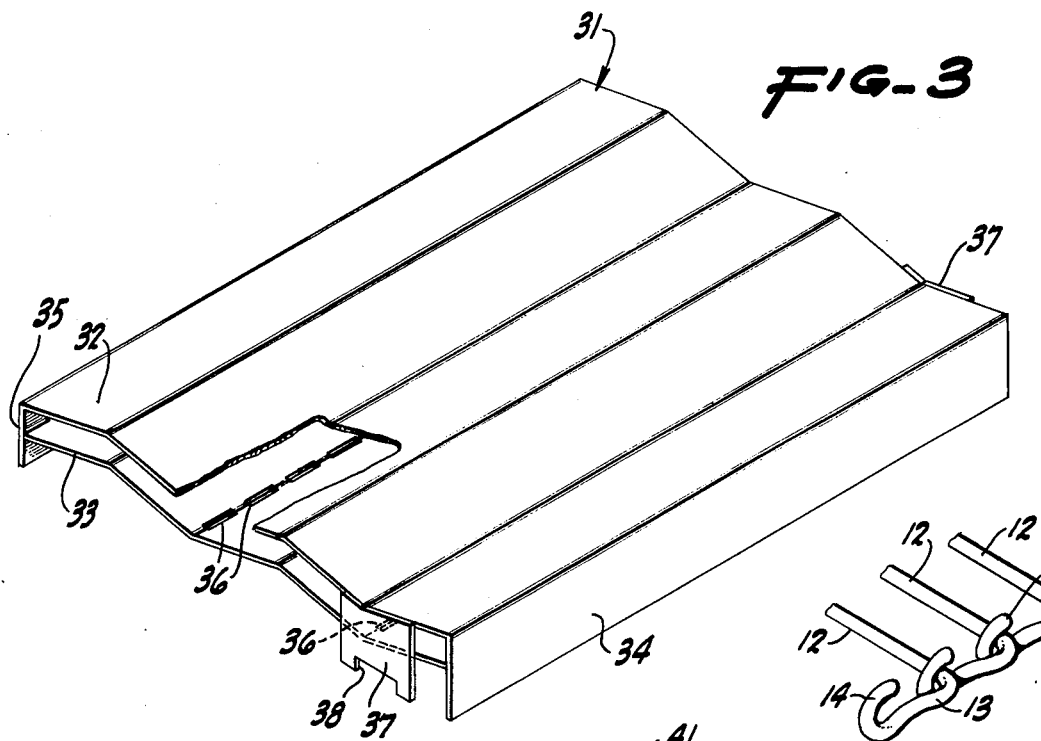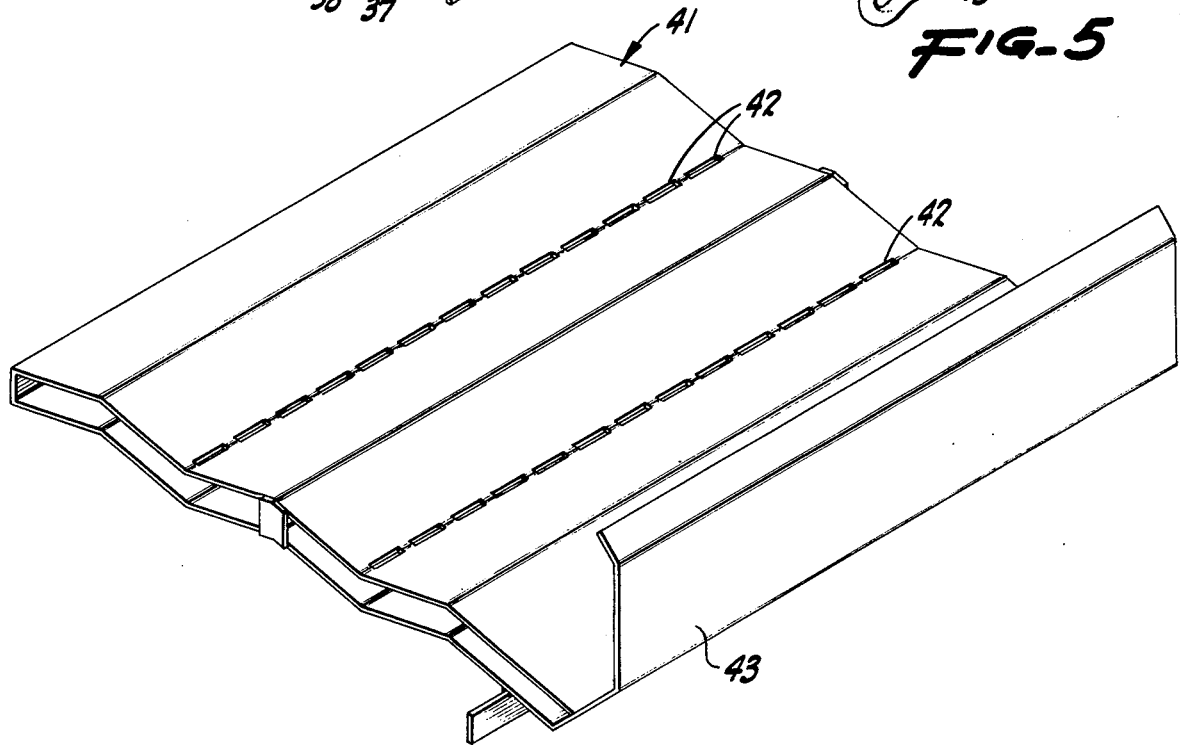

PATTY BROILER

BRIEF SUMMARY OF THE INVENTION

A patty broiler is especially for use in connection with preparing hamburger patties and sometimes also in heating bun crowns and heels useful in connection with the patties. The machine is for relatively simple, small-scale operation and comprises a main frame, in the upper portion of which is arranged a patty conveyor subject to heat from heating elements and also to reflected heat from a pair of reflectors, one above and one below the upper run of the conveyor. To assist in stripping the cooked patties from the patty conveyor, there is a doctor blade especially positioned so that the stripped patties fall by gravity onto a slide on which they return from the far end to the near end of the machine. The buns are warmed by a heating platen near a bun conveyor disposed on the frame and also transmitting some heat to the patty slide. The bun halves go through about the same routine as the patties, a return slide bringing them toward the front of the machine so that the operator can assemble the patty with the bun crown and bun heel. A jacket surrounds the machine not only to conserve heat, but to protect the operator and the machinery. A single operator at the front of the machine can easily load the patties and the buns and can receive and assemble them without moving from his operating spot.

BRIEF DESCRIPTION OF THE SEVERAL VIEWS OF THE DRAWING

FIG. 3 is an isometric perspective view showing a reflector utilized at the upper portion of the machine.

FIG. 4 is an isometric perspective view showing a reflector utilized at the bottom portion of the machine.

FIG. 5 is a detail in perspective showing a portion of the openwork conveyors utilized.

DETAILED DESCRIPTION

Figure 1:
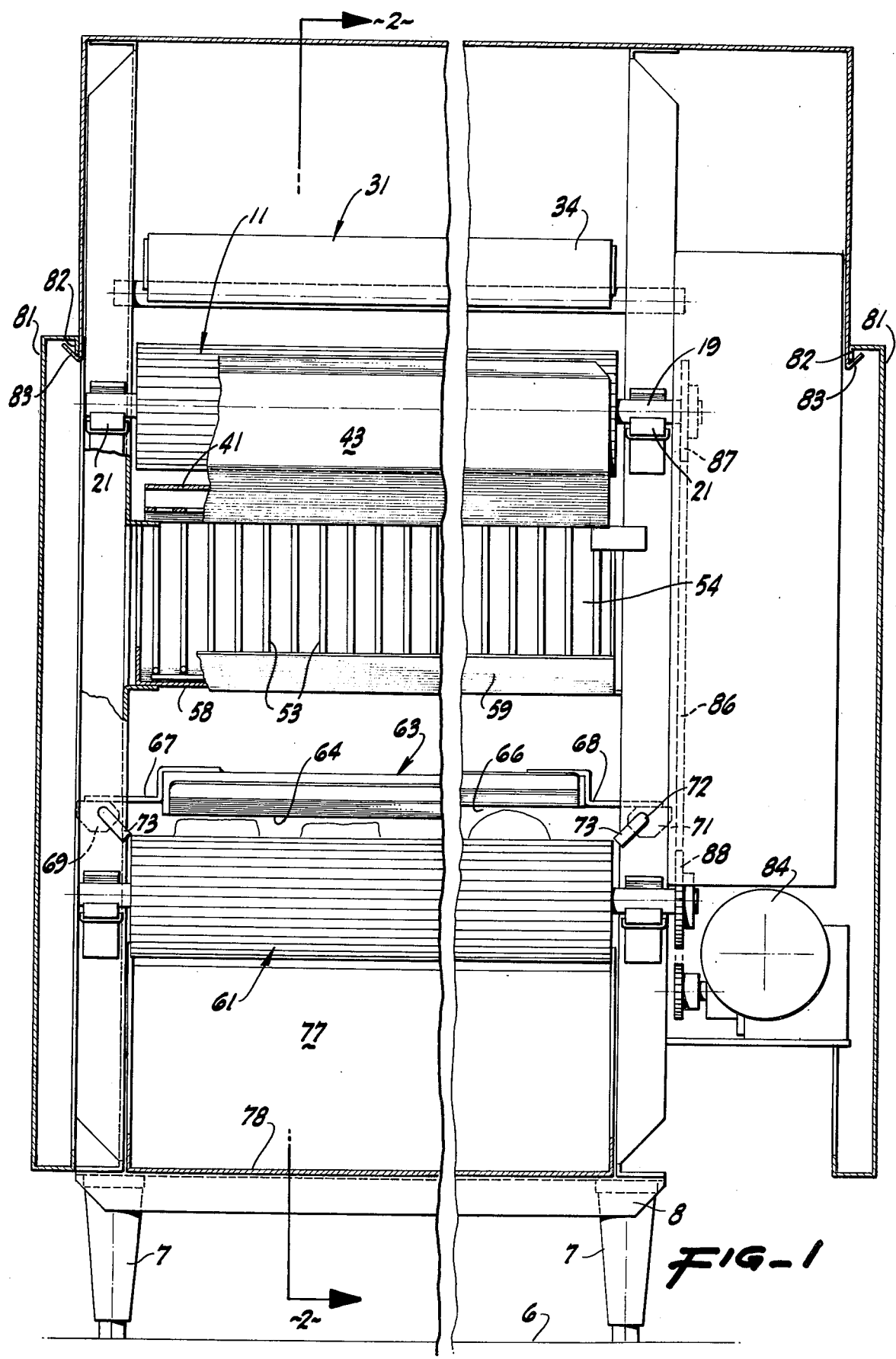
FIG. 1 is a cross-section on the line 1—1 of FIG. 2, parts being broken away.

In the particular form of the invention embodiment chosen for description herein, the device is especially designed for utilization by a single operator and to provide for a relatively small number of patties and hamburgers.

The machine rests on a suitable floor 6 or other support by means of legs 7 which position a frame 8 comprised of angles and channels in the customary way. Near the top of the generally upright frame, there is provided a continuous patty conveyor 11. This conveyor is comprised of an openwork rod construction, as shown particularly in FIG. 5, and includes cross rods 12 formed at their ends to provide knuckles 13, including loops 14 each interengaging with the adjacent rod. The conveyor so formed is trained around a pair of near pulleys 16 and a pair of far pulleys 17. Each of the pulley pairs is disposed on its respective one of two parallel shafts 18 and 19 carried on the frame in reversely disposed, open bearing blocks 21 and 22, preferably of Nylon or Teflon. The conveyor as so arranged then includes a horizontal upper run 23 and a horizontal lower run 24.

Arranged above the upper run 23 is a series of transverse heaters 26, preferably electric rods (although equivalent gas burners can be utilized), and below the upper run and preferably between the upper run and the lower run is a second series of heaters 27 of a similar character. Since the conveyor is of an openwork construction, heat radiating from the upper heaters is effective upon the top of patties 28 on the upper run. Likewise, heat rising from the lower heaters 27 rises between the rods and cooks the bottom of the patties. In this way a patty 28 traveling on the upper conveyor in the direction of the arrow 29 is simultaneously subjected to a broiling operation on both sides.

In order to increase the effect of the heater units and to conserve heating energy, there is provided on the frame above the upper run of the conveyor a first heat reflector 31. This is a specially constructed unit designed to block escape of and to return radiant energy. The reflector 31 is comprised of a pair of spaced-apart sheets 32 and 33, preferably of stainless steel. These are varied from their initial planar form into a dihedral form; that is, a form in which there is a succession of relatively narrow flat panels 34, each arranged at a slight, dihedral angle to the adjacent panel. The panels are secured together by plates 35 at the opposite ends, and preferably at least one of the plates has a number of slotted perforations 36 (FIG. 3) in the troughs of the dihedral portions.

The upper reflector is easily and removably mounted by resting on the frame and by holding brackets 37 having notches 38 in the lower portions thereof to ride on the subjacent heater rod. With this construction, any fumes or vapors that tend to rise and condense on the interior of the two-plate, double reflector subsequently run into the troughs of the lower, dihedral portions and drain by gravity through the vent openings 36.

In a similar fashion and for similar reasons, there is provided below the lower run 24 of the conveyor a similar multiple reflector 41 having a similar dihedral plate construction but having vent openings 42 in the troughs of the upper portion of the reflector as especially shown in FIG. 4. In this instance any liquid materials which fall onto the lower reflector tend to flow into the troughs and through the openings 42 to the interior of the reflector by which they are carried laterally to one of the sides of the machine for disposal. The operating or near end of the reflector 41 is preferably extended to support a guard plate 43 extending upwardly around the forward or near portion of the conveyor and slightly overlaps the margins 44 of a feed opening 46.

In operation, when the heaters are energized and the conveyor is traveling in the direction of the arrow 29, the operator places patties through the opening 46 and deposits them on the upper run 23. The patty is advanced in the direction of the arrow 29 on the upper run 23 of the conveyor 11 and rides under the upper heating element 26 and under the upper reflector 31. The arrangement of the heaters and the dihedral surfaces on the reflector all focus or direct a substantially confined beam of energy onto the upper side of each patty. Energy from the lower heaters 27 and reflection from the dihedral surfaces of the lower reflector 41 serve to focus heat onto the under side of the advancing patties.

In a relatively short advance through the machine, the patties are sufficiently broiled. As each patty approaches the far end of the machine adjacent the pulley 17, it tends to round the curved portion of the conveyor. In some instances the composition of the material being advanced is such that it does not adhere to the conveyor cross bars 12, but easily falls off of the curving conveyor. In other instances, the material is such that it tends to interengage with or adhere to the cross bars 12. The patties do not bend well and tend to break and destroy themselves. For this latter instance, there is provided a doctor blade 51 which is relatively sharp on its leading edge and spans substantially the full width of the conveyor, being slightly cut away to clear the conveyor loops 14. The doctor is suspended on rods 52 interengaging the main frame.

With a doctor blade of this sort, the advancing patty is physically separated from the curving cross bars of the conveyor and so does not bend and break. The detached patty tends to fall by gravity. If the patties are relatively small in diameter, a relatively small doctor blade, perhaps farther down the curve, is available.

It may be arranged that the patties fall top side up or that they invert in falling and fall top side down. In any event, the disengaged patty falls by gravity from the far end of the upper conveyor and is intercepted by slide bars 53 overlying an inclined drip plate 54 with side margins 56 thereon. The slide bars are disposed on the frame at such an angle that the falling patty continues downwardly, gaining some velocity, and finally slides onto a relatively flat tray 57. This is also part of the slide bars and is disposed substantially beneath the major portion of the upper conveyor and above a drip pan 58. A lip 59 on the drip pan serves as a stop. In detaching from the conveyor, the patty may fall without inversion or may turn over, but in any event advances and then comes to a stop within the flat portion 57 of the slide bars. This portion is immediately available to the operator through the open front of the machine so that the operator can remove the completed patty.

While the machine as so far described can serve solely as a patty cooker or broiler, it is often the case that hamburgers are to be fabricated, and in that instance it is preferred to provide on the frame 8 a bun conveyor 61 generally similar to the patty conveyor and similarly mounted on the frame in a position below but parallel to the patty conveyor.

Figure 2:
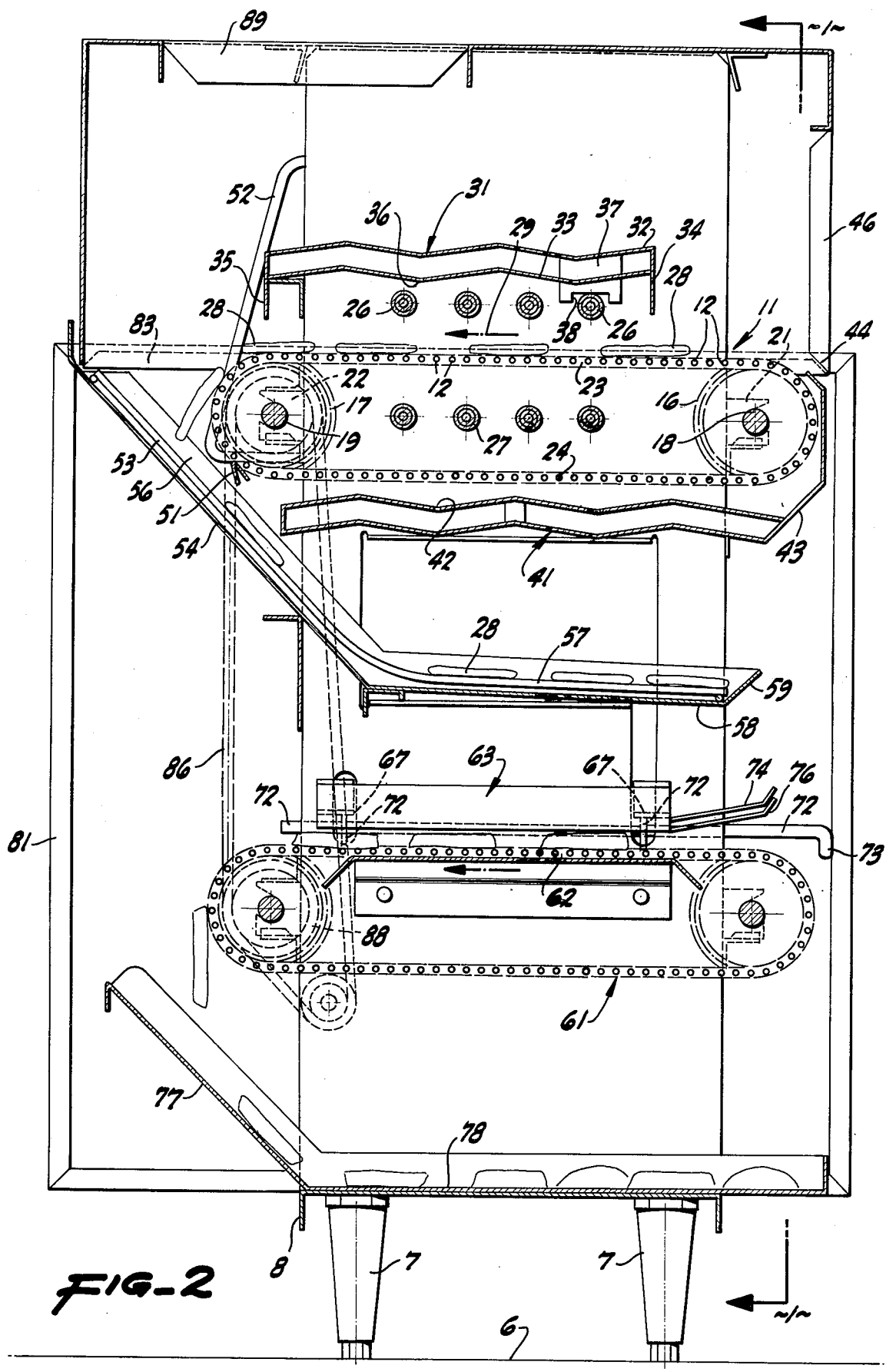
FIG. 2 is a cross-section, the plane of which is indicated by the line 2—2 of FIG. 1.

Above the upper run 62 of the bun conveyor is a bun heater platen 63 having, as shown in FIG. 1, a relatively low portion 64 and a relatively high portion 66. These portions are respectively for the heel and the crown of a cut hamburger bun. The platen is supported by brackets 67 and 68 on position cams 69 and 71, each pair of cams being fast on a through rod 72 (FIG. 2) pivoted in the frame and having a control handle 73 at the near end thereof. Bun entry guides 74 and 76 are provided just above the upper run 62. The heating platen 63 is located in a part of the mechanism so that some heat escaping from the bun platen heaters is transmitted upwardly to and assists in warming the patty return slide bars 53 and the plate 54.

In use, the bun part of the structure has the platen brackets 67 and 68 first adjusted by rotation of the handles 73 to turn both of the rods 72 and correspondingly position the cams 69 and 71 to afford the desired elevation of the bun platen. After the conveyor 61 has been energized, bun crowns and heels are fed in between the conveyor and the respective one of the guides 74 and 76. The bun parts are advanced generally in physical contact with the platen for the length of the conveyor. At the far end they emerge from beneath the platen and fall without difficulty off of the rounded far end of the conveyor onto a bun slide 77 leading to a bun retaining tray 78, access to which is available from the open front of the machine.

In this fashion the operator, staying in one location, can feed the patties and the buns appropriately and can then retrieve the warmed buns and the broiled patties and assemble them for consumption.

The entire structure, except for necessary openings for operator access, is preferably housed by enclosing and reflecting panels 81. These are conveniently mounted and are removable by simply being hooked into or unhooked from position, as shown in FIG. 1. Panel hooks 82 engage in upstanding troughs 83 on the permanent parts of the enclosure.

The conveyors are driven by an electric motor 84 (FIG. 1) connected through a chain mechanism 86 and sprockets 87 and 88 so that the two conveyors are advanced simultaneously and at the desired velocity ratio.

Since sometimes the material of the patty, when heated, bursts into flame and emits some smoke, and since there is sometimes smoke and some fumes arising from the broiling operation, the upper portion of the enclosure 81 preferably includes a vent opening 89 discharging into an exhaust hood, not shown.

The mechanism as described is eminently suitable for automatic broiling and heating of patties and buns and is an effective instrument as a relatively small-scale automated hamburger production device.

Figure 6:
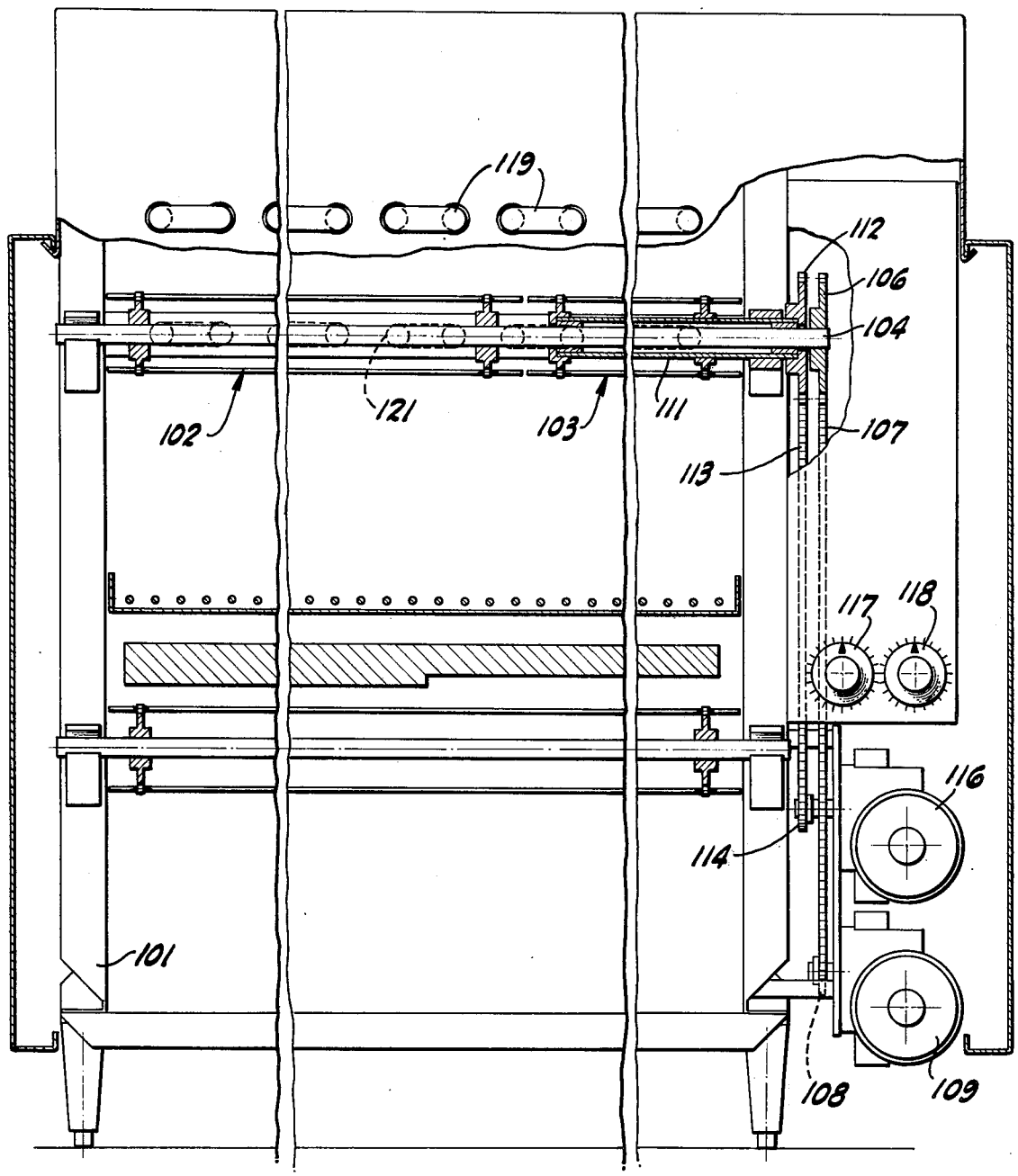
FIG. 6 is a view, comparable to FIG. 2, of a modified device.

In the device shown in FIGS. 1–5, the cooking of all of the various patties or comparable units is substantially uniform since they are subjected to substantially the same source of heat for the same length of time. Under some circumstances it is desirable to provide different cooking times for different items going through the machine. This may be the case when patties are cooked at approximately the same time as steaks, for example. For use under such conditions, an arrangement as shown in FIG. 6 is employed. The general layout is as previously described, but in this instance on the frame 101 there is provided a first cooking conveyor 102 and a second, parallel cooking conveyor 103. The two conveyors are substantially in registry with each other when viewed horizontally and are carried on substantially coincident or parallel axes.

The conveyor 102 conveniently extends over somewhat more than half the width of the machine, while the conveyor 103 occupies the remaining width of the device, although equal widths can be employed.

The conveyor 102 is driven by a drive shaft 104 extending for the full width of the machine and at its far end carrying a driven sprocket 106 connected by a chain 107 to a gear reducer sprocket 108 driven by an individual motor 109.

The conveyor 103 is carried on and driven by a tubular shaft 111 journalled on and coaxial with the shaft 104. At its outboard end the shaft 111 carries a sprocket 112 joined by a chain 113 to a speed reducer sprocket 114 driven by a second, independent electric motor 116.

The motor 109 is set as to speed of operation by a controller 117, whereas the motor 116 is set as to speed of operation by an entirely separate controller 118.

By properly setting the controllers 117 and 118, the motors 109 and 116 can be operated to drive the conveyors 102 and 103 at different linear speeds. Thus, for example, if patties are cooked on the conveyor 102, that conveyor can be set to operate at a relatively rapid rate, whereas if steaks or the like are cooked on the conveyor 103, then such conveyor can be set to advance at a slower linear rate. Both different items can be properly cooked for individual times and during approximately the same time period. Alternatively, in the event only a relatively small amount of material is to be cooked, either the conveyor 102 can be operated solely or the conveyor 103 can be operated solely, thus saving the energy involved in operating one of the motors 109 or 116. A similar lateral separation and arrangement can be made between the individual heating elements 119 and 121 so that only elements immediately above the operating one of the conveyors 102 or 103 are energized at that time, thus further saving energy input to the machine.

Figure 7:
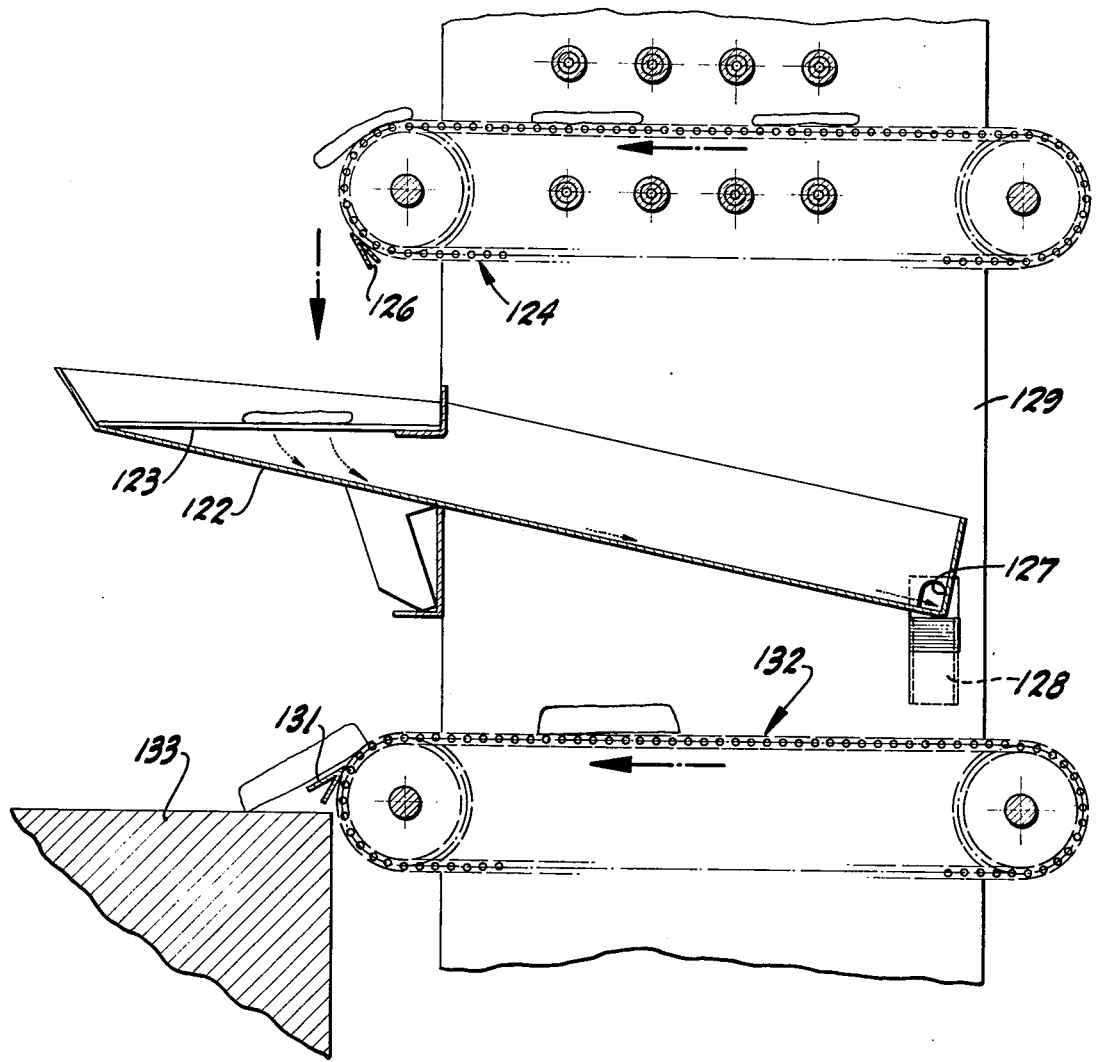
FIG. 7 is a view on a vertical, longitudinal plane, portions being omitted, of the structure illustrated in FIG. 6.

There are instances in which because of installation arrangement or the like it is desirable to feed the foodstuffs into the machine at one end but to have them delivered at the opposite end rather than to the same, feed end. In that instance the arrangement as shown in FIG. 7 is employed. This is in most particulars entirely the same as the device in FIGS. 1-5 but differs at the discharge end. Instead of a steep return slide for the products, there is provided a return pan 122 supported on the frame and extending from a substantial distance away from the discharge end downwardly and forwardly toward the feeding end. On the projecting portion of the pan 122 there is provided a substantially level support 123 of foraminous material positioned below the discharge of the upper conveyor 124. Patties leaving the conveyor 124, either under their own impetus or as stripped by a doctor blade 126, fall onto and lodge on the support 123 and so are available for easy removal. Any grease dripping from the so-discharged patties travels in the pan 122 to the forward portion of the machine and there is discharged through a vent opening 127 into a grease duct 128 for appropriate disposal.

In a somewhat similar fashion, also at the discharge end of the machine, there is provided a frame 129 effective to support a doctor blade 131 positioned with respect to the lower conveyor 132 so as to assist in stripping off and transferring therefrom bun crowns and bun heels and delivering them to an adjacent countertop 133. The countertop is not presently a portion of the machine itself, but is an adjacent fixture. However, should it be desired to do so, the countertop 133 can be supported from the main frame of the machine very much as is the pan 122. With this arrangement and without any changes to the remaining part of the structure, it is possible to provide a device of a "through flow" pattern so that materials fed in at one end are treated and then discharged at the other end, rather than being discharged to the feed end.

What is claimed is:

1. A patty broiler comprising a frame, an openwork conveyor, means for mounting said conveyor on said frame for movement in a closed path with an upper horizontal run and a lower horizontal run connected by a substantially semi-circularly curved feeding end at the forward portion of said frame and a substantially semi-circularly curved discharge end at the rearward portion of said frame, an upper set of heaters on said frame above said upper run and directing heat downwardly onto said upper run, a lower set of heaters on said frame between said upper run and said lower run and directing heat upwardly onto said upper run, a transversely extending doctor blade relatively sharp on its leading edge, rods on said frame and engaging the ends of said doctor blade for supporting said doctor blade on said frame disposed in approximate contact with said conveyor at a location substantially vertically beneath the lower portion of said curved discharge end and adjacent the end of said lower run for separating patties from said conveyor for free fall in inverted position, and sloping guide means on said frame directly below said curved discharge end for intercepting inverted patties falling freely from said curved discharge end, said slopping means including a guide receiver beginning at a high point outwardly of said discharge end and extending downwardly and forwardly beneath said curved discharge end across the path of a patty falling from said curved discharge end and ending at a low point substantially beneath said curved feeding end to position said patties near said feeding end with that side uppermost which was in contact with said upper run, and reflectors on said frame above and below said conveyor runs, each of said reflectors including a pair of dihedrally configured parallel sheets spaced apart in the direction of radiation from said heaters.

* * * * *